INVENTOR:
GEORGE J. FISCHER,
BY Kingsland, Rogers, Ezell, Eilers & Robbins
ATTORNEYS April 9, 1968 G. J. FISCHER 3,377,427

LIGHT-SENSITIVE OPTICAL CONTROL SYSTEM FOR A TELEVISION CAMERA

Filed July 29, 1965 2 Sheets-Sheet 2

INVENTOR:
GEORGE J. FISCHER,
BY Kingsland, Rogers, Ezell, Eilers & Robbins
ATTORNEYS United States Patent Office 3,377,427
Patented Apr. 9, 1968

3,377,427

LIGHT-SENSITIVE OPTICAL CONTROL SYSTEM FOR A TELEVISION CAMERA

George J. Fischer, 2030 Lonedell, Arnold, Mo. 63010

Filed July 29, 1965, Ser. No. 475,712
18 Claims. (Cl. 178—7.92)

ABSTRACT OF THE DISCLOSURE

A mounting bracket is secured to a television camera adjacent the lens of that camera; and that mounting bracket supports a light-sensitive cell which can sense the light directed toward that lens, and also supports a solenoid which can move a light-intercepting element into position in front of that lens to protect the light-sensitive tube of that camera from injury whenever the intensity of the light directed toward that lens exceeds a predetermined value.

Figures 1, 2, 3, 4, 5:
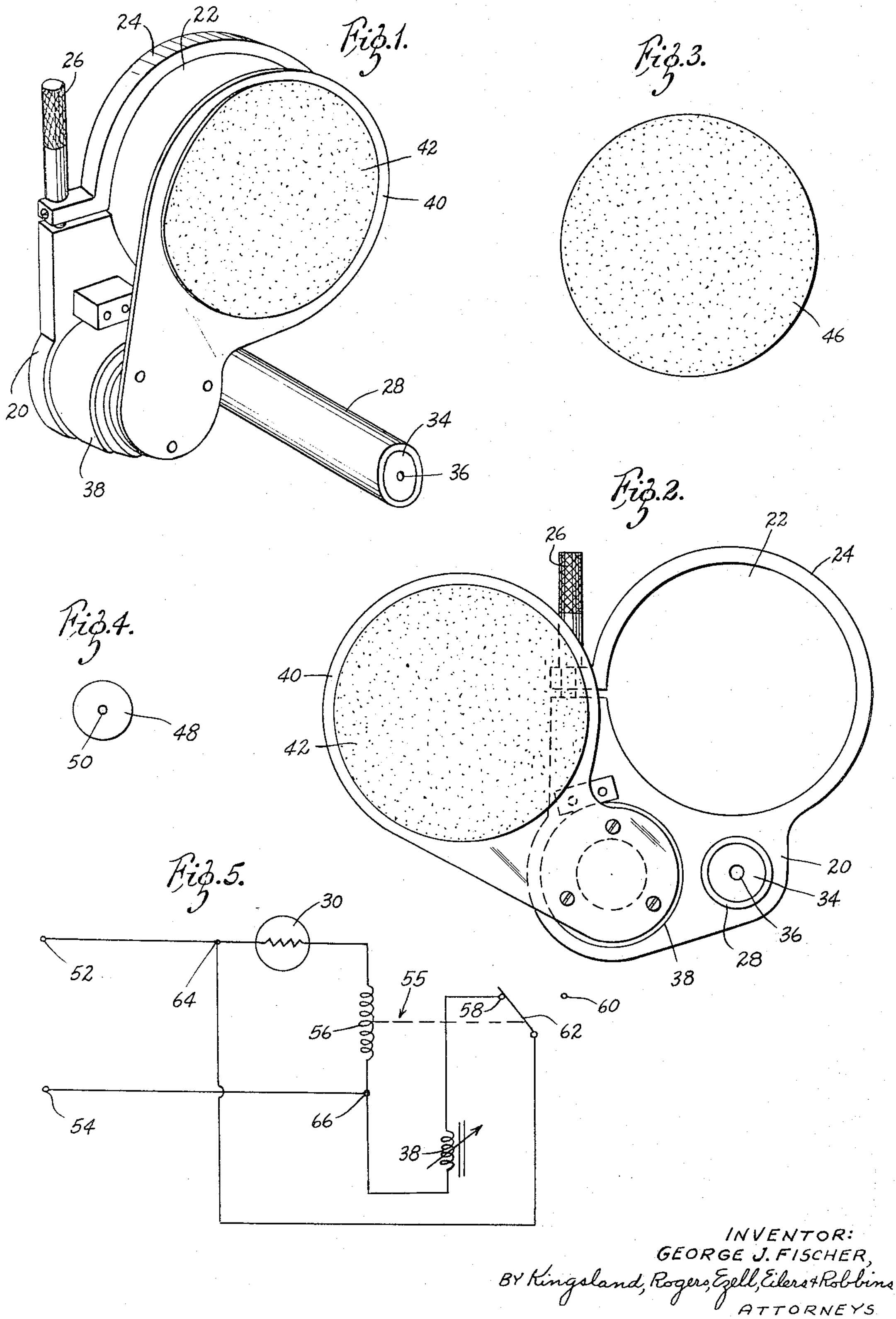

This invention relates to improvements in control systems. More particularly, this invention relates to improvements in control systems for cameras which have vidicon or other light-sensitive tubes.

It is, therefore, an object of the present invention to provide a control system for a camera which has a vidicon or other light-sensitive tube.

In some closed-circuit television installations, the subjects or objects which are viewed by the vidicon or other light-sensitive tubes of the television cameras are illuminated by natural light during part of the time and are illuminated by artificial light during further parts of the time. The differences between the intensities of the illumination provided by natural light and by artificial light can, in many instances, be so great that the automatic light compensation circuits for the vidicon or other light-sensitive tubes cannot fully compensate for those differences. Those differences can, in some instances, be great enough to cause injury to the phosphors of those tubes. In all such instances, it has been necessary to "close" the irises of the television cameras during those periods when the subjects or objects were to be illuminated by natural light—so the total amounts of light reaching the vidicon or other light-sensitive tubes were reasonably comparable to the amounts of light which reached those tubes when those subjects or objects were illuminated by artificial light. Thereafter, when those subjects or objects were to be illuminated by artificial light, the irises of the television cameras had to be "opened" to enable enough light to reach the vidicon or other light-sensitive tubes to enable the television cameras to function properly. To recurrently "close" and "open" those irises by hand requires the services of skilled persons, and can involve delays which could lead to "loss of picture" and could even lead to injuries to the phosphors of the vidicon or other light-sensitive tubes. Further, in some instances, the television cameras are located in positions where it is difficult to reach them, much less to correctly adjust the settings of the irises thereof. To recurrently "close" and "open" the irises of television cameras by automatic or manually-operated remotely-located iris control systems involves considerable cost. Furthermore, the rates at which such systems change the settings of irises are slow enough to permit transient light of high intensity to cause "loss of picture" and even to cause injury to the phosphors of the vidicon or other light-sensitive tubes. It would be desirable to provide a control system for a camera, which has a vidicon or other light-sensitive tube, that could quickly and automatically reduce the amount of light passing to that tube whenever the intensity of the light directed toward that tube exceeded a predetermined level, and that would automatically increase the amount of light passing to that tube when the intensity of the light directed toward that tube subsequently decreased below that level. The present invention provides such a control system; and it does so by disposing a filter-like, light interceptor adjacent the "field" of the vidicon or other light-sensitive tube of a television camera and by automatically moving that light interceptor into that field whenever the intensity of the light directed toward that tube exceeds a predetermined level. As long as the intensity of the light directed toward that tube is below a predetermined level, that light interceptor will remain out of the "field" of that tube, and hence that tube can receive all of the light directed toward it; but, as soon as the intensity of the light directed toward that tube exceeds that predetermined level, the control system will automatically move that light interceptor into the "field" of that tube to reduce the intensity of the light which reaches that tube.

It is, therefore, an object of the present invention to provide a control system for a camera, which has a vidicon or other light-sensitive tube, that can quickly and automatically reduce the amount of light passing to that tube whenever the intensity of the light directed toward that tube exceeds a predetermined level, and that automatically increases the amount of light passing to that tube when the intensity of the light directed toward that tube subsequently decreases below that level.

The control system provided by the present invention includes a light-sensitive cell which receives light from the subjects or objects "seen" by the television camera and also includes a light-restricting element that is disposed in front of that light-resistive cell. In using that control system, the maximum intensity of light that will be directed toward the camera at any time will be measured, and a filter-like light interceptor with the appropriate value of light absorption will be selected. Also, a light-restricting element of the appropriate size will be selected. That light-restricting element and that light interceptor will cause the control system to interpose that light interceptor between the vidicon or other light-sensitive tube of the camera and the subjects or objects "seen" by that camera whenever the intensity of the light directed toward that camera reaches a value which is beyond the capability of the automatic light compensation circuit for that camera or which could injure the phosphors of that tube.

Other and further objects and advantages of the present invention should become apparent from an examination of the drawing and accompanying description.

In the drawing and accompanying description three preferred embodiments of the present invention are shown and described but it is to be understood that the drawing and accompanying description are for the purpose of illustration only and do not limit the invention and that the invention will be defined by the appended claims.

In the drawing:

FIG. 1 is a perspective view of some of the elements of one preferred embodiment of control system that is made in accordance with the principles and teachings of the present invention.

Figure 6:
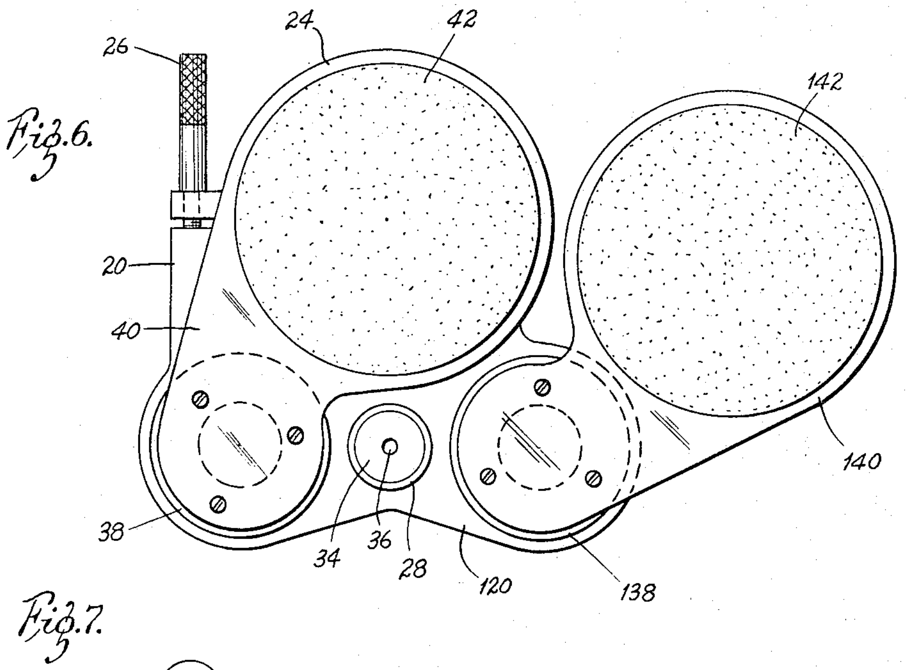
Figure 7:
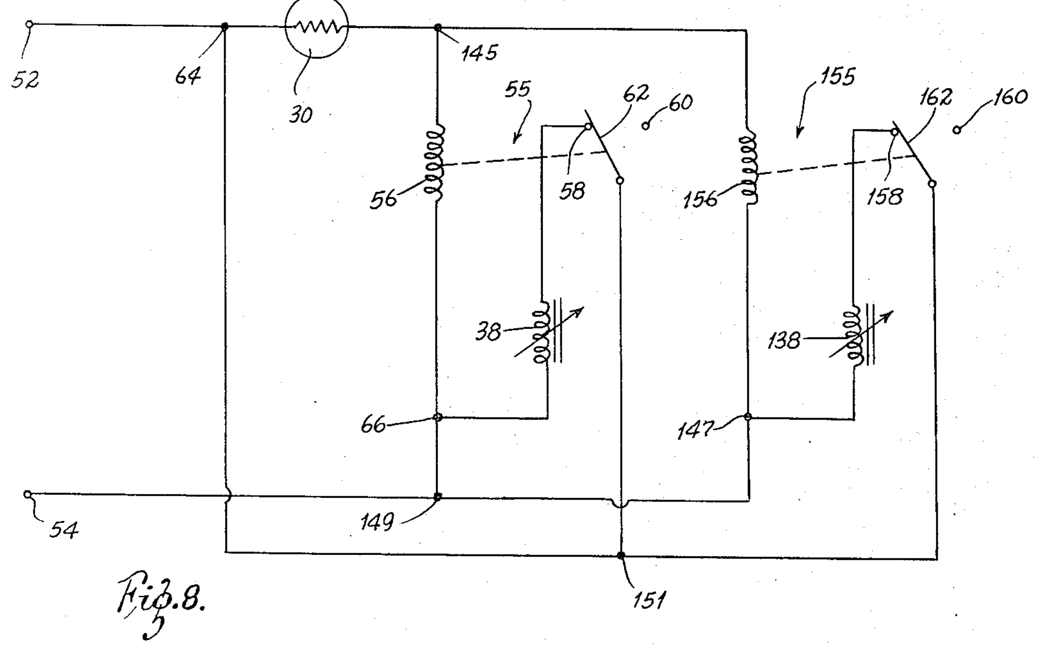
Figure 8:
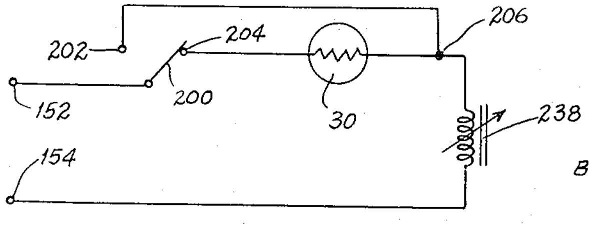

FIG. 2 is a front elevational view of the elements shown in FIG. 1, but it shows the light-intercepting element of FIG. 1 in its moved position, FIG. 3 is a front elevational view of a light-interceptor that can be substituted for the light interceptor of the light-intercepting element of FIG. 1, FIG. 4 is a front elevational view of a light-restricting element that can be substituted for the light-restricting element of FIG .1, FIG. 5 is a schematic diagram of the electrical circuit of the control system shown in FIG. 1, FIG. 6 is a front elevational view of some of the elements of another preferred embodiment of control system that is made in accordance with the principles and teachings of the present invention, FIG. 7 is a schematic diagram of the electrical circuit of the control system shown in FIG. 6, and FIG. 8 is a schematic diagram of the electrical circuit for a further control system.

Referring to FIGS. 1–5 in detail, the numeral 20 generally denotes a mounting bracket which can be secured to the lens barrel of a camera which includes a vidicon or other light-sensitive tube. That mounting bracket has a split ring 24 which defines an opening 22 that accommodates the lens barrel of the said camera; and a clamping screw 26, carried by that mounting bracket, can be tightened to force the inner surface of that split ring into clamping engagement with that lens barrel. When the clamping screw 26 is tightened, the mounting bracket 20 will move as a unit with the lens barrel of the camera.

A housing 28, which is shown as having a generally-cylindrical configuration, is secured to and extends forwardly from the mounting bracket 20. That housing encloses a light-sensitive cell 30; and that housing protects that light-sensitive cell against stray light. The light-sensitive cell 30 is of the photoresistance type; and the electrical resistance of that light-sensitive cell decreases as the amount of light reaching that light-sensitive cell increases. The front of the housing 28 releasably holds a light-restricting element 34 which is in the form of a circular disc and which has an opening 36 therein. The housing 28 and the light-restricting element 34 coact to keep all light, other than that which passes through the opening 36, away from the light-sensitive cell 30. The opening 36 is in register with the light-sensitive cell 30, and it permits light to fall upon that cell. The housing 28 is close to the opening defined by the split ring 24; and it will move as a unit with the lens barrel whenever the clamping screw 26 is tight. As a result, the light-sensitive cell 30 will tend to "see" part of the subjects and objects "seen" by the vidicon or other light-sensitive tube of the camera.

The stator of a rotary solenoid 38 also is secured to and extends forwardly from the mounting bracket 20. A light-intercepting element 40 is secured to the rotor of the rotary solenoid 38, and that light-intercepting element carries a light interceptor 42. The light-intercepting element 40 is shown as a flat plate with a large circular opening therein; and the light interceptor 42 is shown as a flat circular "gelatin," or other light-absorbing or color-absorbing material, held in register with the opening in the light-intercepting element 40. The light interceptor 42 is preferably held in register with the opening in the light-intercepting element by a pressure-sensitive tape. Whenever the rotary solenoid 38 is de-energized, the returning spring of that rotary solenoid will hold the light interceptor 42, carried by the light-intercepting element 40, in register with the opening defined by the split ring 24 of the mounting bracket 20, as shown by FIG. 1. This means that the light interceptor 42 will be in register with the lens barrel of the camera, and that the intensity of the light passing to the vidicon or other light-sensitive tube will be reduced by that light interceptor. However, whenever the rotary solenoid 38 is energized, the light interceptor 42, carried by the light-intercepting element 40, will be moved from the position of FIG. 1 to the position of FIG. 2; and, in the latter position, that light interceptor will be out of register with the lens barrel of the camera. As a result, the intensity of the light passing to the vidicon or other light-sensitive tube will not be reduced by the light interceptor 42.

The numeral 46 in FIG. 3 denotes a light interceptor which can be substituted for the light interceptor 42 held by the light-intercepting element 40 in FIGS. 1 and 2. The light absorption or the color absorption of the light interceptor 46 will be different from the light absorption or color absorption of the light interceptor 42. The numeral 48 in FIG. 4 denotes a light-restricting element with an opening 50 therein which differs in size from the opening 36 in the light-restricting element 34 of FIGS. 1 and 2. The light-restricting element 48 can be substituted for the light-restricting element 34 in the front of the housing 28.

The light interceptors 42 and 46 are just two of a large number of light interceptors that can be used. Similarly, the light-restricting elements 34 and 48 are just two of a large number of light-restricting elements that can be used. In addition, two or more light interceptors can be held simultaneously by the light-intercepting element 40; and those various light interceptors can be selected to provide any desired combination of light absorption and color absorption.

If a light interceptor 42 of a given light absorption and color absorption and a light-restricting element 34 with an opening 36 of a given size are being used, and it is deemed desirable to actuate the rotary solenoid 38 at a lower level of light intensity, a light-restricting element 48 that has an opening 50 larger than the opening 36 will be substituted for the light-restricting element 34. Conversely, if a light interceptor 42 of a given light absorption and color absorption and a light-restricting element 34 with an opening 36 of a given size are being used, and it is deemed desirable to actuate the rotary solenoid 38 at a higher level of light intensity, a light-restricting element 48 that has an opening 50 smaller than the opening 36 will be substituted for the light-restricting element 34. If a light interceptor 42 of a given light absorption and color absorption and a light-restricting element 34 with an opening 36 of a given size are being used, and it is deemed desirable to absorb more light or to absorb more of a particular color, a light interceptor 46 that will provide a higher degree of light absorption or a higher degree of absorption of that particular color will be substituted for the light interceptor 42. Conversely, if a light interceptor 42 of a given light absorption and color absorption and a light-restricting element 34 with an opening 36 of a given size are being used, and it is deemed desirable to absorb less light or to absorb less of a particular color, a light interceptor 46 that will provide a lower degree of light absorption or a lower degree of absorption of that particular color will be substituted for the light interceptor 42. By appropriate selection of the size of the opening in the light-restricting element, it is possible to have the rotary solenoid 38 become energized, and thereby move the light interceptor into register with the lens barrel of the camera, at almost any desired level of light or color intensity. By appropriate selection of the light interceptor or combination of light interceptors carried by the light-intercepting element 40, it is possible to provide almost any desired level of light absorption or color absorption.

In the preferred embodiment shown by FIGS. 1–5, the light interceptor 46 absorbs more light than does the light interceptor 42; and the opening 50 in the light-restricting element 48 in FIG. 4 is smaller than the opening 36 in the light-restricting element 34 in FIG. 1. The light interceptor 46 and the light-restricting element 48 of FIGS. 3 and 4, respectively, may be used when the amount of light to which the camera will be exposed is greater than the light to which that camera will be exposed when the light interceptor 42 and the light-restricting element 34 are used with that camera.

The numerals 52 and 54 in FIG. 5 denote terminals which are connectable to a source of power. The terminal 52 is connected to one terminal of the light-sensitive cell 30 by a junction 64; and the terminal 54 is connected to the other terminal of that light-sensitive cell by a junction 66 and by the coil 56 of a relay 55. That relay has stationary contacts 58 and 60 and has a movable contact 62. Whenever the relay coil 56 is de-energized, the movable contact 62 will engage the stationary contact 58 and will be spaced away from the stationary contact 60. However, when "pull in" current flows through the relay coil 56, the movable contact 62 will move out of engagement with the stationary contact 58 and into engagement with the stationary contact 60.

If the mounting bracket 20 is secured to the lens barrel of a camera for a closed television circuit which is to "see" subjects or objects illuminated by natural light for part of the time and illuminated by artificial light for other parts of the time, the iris of that camera will be set in or close to its maximum open position and a light interceptor 42 will be selected which will keep the amount of light passing to the vidicon or other light-sensitive tube of that camera from exceeding a value which cannot be compensated for by the automatic light compensation circuit of that camera. Also, a light-restricting element 34 will be selected which will enable the circuit of FIG. 5 to hold that light interceptor out of register with the lens barrel of that camera as long as the intensity of the illumination of the subjects or objects "seen" by the vidicon or other light-sensitive tube of the camera does not materially exceed the intensity of illumination provided by the artificial light, but that will enable that circuit to dispose that light interceptor in register with that lens barrel whenever the intensity of the illumination of the subjects or objects "seen" by the vidicon or other light-sensitive tube of the camera does materially exceed the intensity of illumination provided by the artificial light.

Whenever the power to the circuit of FIG. 5 is shut off, as by a switch between the terminals 52 and 54 and the source of power, the relay coil 56 and the rotary solenoid 38 will be de-energized. The movable contact 62 will be in engagement with the stationary contact 58, and thus in position to complete a circuit between the rotary solenoid 38 and the terminals 52 and 54; but that rotary solenoid will be de-energized because no power will be supplied to those terminals. When those terminals are connected to the source of power, current will flow from terminal 52 via junction 64, light-sensitive cell 30, relay coil 56, and junction 66 to the terminal 54; and current also will tend to flow from terminal 52 via junction 64, movable and stationary contacts 62 and 58, rotary solenoid 38, and junction 66 to the terminal 54. If the intensity of the illumination of the subjects or objects "seen" by the vidicon or other light-sensitive tube of the camera does not materially exceed the intensity of illumination provided by the artificial light the resistance of the light-sensitive cell 30 will be great enough to keep the current flowing through the relay coil 56 below the "pull in" level. As a result, the movable contact 62 will remain in engagement with the stationary contact 58, and the rotary solenoid 38 will become energized. Thereupon, the rotor of that rotary solenoid will rotate the light-intercepting element 40 from the position of FIG. 1 to the position of FIG. 2. This is desirable because it will enable the vidicon or other light-sensitive tube of the camera to receive the level of illumination which it needs to cause the camera to function porperly.

However, if the intensity of the illumination of the subjects or objects "seen" by the vidicon or other light-sensitive tube of the camera does happen to exceed the intensity of illumination provided by the artificial light, the light reaching the light-sensitive cell 30 will reduce the resistance of that light-sensitive cell to the point where sufficient current will flow from terminal 52 via junction 64, that light-sensitive cell, relay coil 56, and junction 66 to the terminal 54 to cause that relay coil to shift the movable contact 62 away from the stationary contact 58. Thereupon, the circuit for the rotary solenoid 38 will be interrupted; and the returning spring of that rotary solenoid will rotate the light-intercepting element 40 from the position of FIG. 2 to the position of FIG. 1. In the latter position, the light interceptor 42 will permit enough light to pass to the vidicon or other light-sensitive tube of the camera to enable that camera to function properly; but it will keep the amount of the light passing to that vidicon or other light-sensitive tube from exceeding a value which cannot be compensated for by the automatic light compensation circuit of that camera and will keep the amount of light passing to that vidicon or other light-sensitive tube from exceeding a value which could injure the phosphors of that tube.

As long as the amount of light which passes through the opening 36 in the light-restricting element 34 and reaches the light-sensitive cell 30 exceeds a predetermined level—which will be less than the level of light which reached that light-sensitive cell when the relay coil 56 shifted the movable contact 62 away from the stationary contact 58, because the value of the "hold in" current for the relay coil 56 is less than value of the "pull in" current for that relay coil—the light-intercepting element 40 will remain in the position shown by FIG. 1. This means that the light interceptor 42 will continue to limit the amount of light which can pass to the vidicon or other light-sensitive tube of the camera. However, once the amount of light passing to the light-sensitive cell 30 falls below the said predetermined level, the resistance of that light-sensitive cell will increase to the point where the current flowing through the relay coil 56 will be insufficient to hold the movable contact 62 away from the stationary contact 58. Thereupon, that movable contact will move back into engagement with that stationary contact; and the rotary solenoid 38 will again become energized, and will again rotate the light-intercepting element 40 into the position shown by FIG. 2.

In this way, the control system provided by the present invention will dispose the light-intercepting element 40 out of register with the lens barrel of the camera as long as the intensity of the light passing to that lens barrel is below a predetermined value; but will dispose that light-intercepting element in register with that lens barrel whenever the intensity of the light directed toward that lens barrel exceeds that predetermined value. The control system will thereafter hold that light-intercepting element in register with that lens barrel as long as the intensity of the light reaching the light-sensitive cell 30 exceeds a predetermined level. However, when the intensity of the light reaching that light-sensitive cell falls below that predetermined level, the control system will permit the light-intercepting element 40 to move out of register with the lens barrel.

In determining the color absorption and light absorption characteristics needed for the light interceptor 42, and in determining the size of the opening 36 needed in the light-restricting element 34, measurements should be made with a light meter to ascertain the maximum level of the light directed toward the lens barrel of the camera. The size of the opening 36 in the light-restricting element 34 should be large enough to enable the control system to shift the light interceptor 42 into register with the lens barrel of the camera before the intensity of the light reaching that lens barrel can exceed a value which could not be compensated for by the automatic light compensation circuit of that camera. The color absorption and light absorption characteristics for the light interceptor should keep the intensity of the light reaching the lens barrel of the camera from exceeding a value which could injure the phosphors of the vidicon or other light-sensitive tube of that camera. With the preferred embodiment of invention shown in FIGS. 1–5, the opening 36 in the light-restricting element 34 can be one hundred and thirty-eight thousandths of an inch in diameter when the light interceptor 42 is substantially opaque, can be one hundred and eighty-five thousandths of an inch in diameter when the light interceptor 42 has a light transmissibility of about seventy-five percent, can be one hundred and ninety-four thousandths of an inch in diameter when the light interceptor 42 has a light transmissibility of about sixty-five percent, can be two hundred and three thousandths of an inch in diameter when the light interceptor 42 has a light transmissibility of about fifty-five percent, and can be two hundred and fifteen thousandths of an inch in diameter when the light interceptor 42 has a light transmissibility of about forty percent. However, these diameters are merely illustrative; and many different diameters could be used.

FIGS. 6 and 7 show a control system wherein two light-intercepting elements are used. That control system has a mounting bracket 120 which is similar to the mounting bracket of FIG. 1, in that it has a split ring 24 and a clamping screw 26 and in that it supports a housing 28 plus a rotary solenoid 38 which can be identical to the split ring 24, the clamping screw 26, the housing 28 and the rotary solenoid 38 of FIG. 1. However, that mounting bracket differs from the mounting bracket 20 in supporting a second rotary solenoid 138. The housing 28 encloses a light-sensitive cell 30, and it has a light-restricting element 34 in the end thereof; and that light-sensitive cell and that light-restricting element can be identical to the light-sensitive cell 30 and light-restricting element 34 of FIGS. 1–5. The rotor of the rotary solenoid 138 supports a light-intercepting element 140 which carries a light interceptor 142; and that light interceptor will absorb less light or less color than the light interceptor 42 can absorb.

As shown by FIG. 7, the coil 156 of a relay 155 is connected in parallel with the coil 56 of the relay 55. A movable contact 162 of the relay 155 normally engages the stationary contact 158 of that relay; but, whenever the relay coil 156 is energized, the movable contact 162 will move out of engagement with that stationary contact and into engagement with the stationary contact 160. The "pull in" current of the relay coil 156 is less than the "pull in" current of the relay coil 56.

Whenever the terminals 52 and 54 of FIG. 7 are disconnected from the source of power, as by a switch intermediate those terminals and that source of power, the relay coils 56 and 156 and the rotary solenoids 38 and 138 will be de-energized. At such time, the returning springs of the rotary solenoids 38 and 138 will dispose both of the light-intercepting elements 40 and 140 in their intercepting positions so the light-interceptors 42 and 142 thereof will be in the "field" of the vidicon or other light-sensitive tube of the television camera. The light-intercepting element 40 is shown in its intercepting position in FIG. 6; and, when the light-interecepting element 140 is in its intercepting position, the light interceptor 142 thereof will be in register with the light interceptor 42 of the light-intercepting element 40. The rotor of the rotary solenoid 138 will be disposed forwardly of the rotor of the rotary solenoid 38 so the light-intercepting element 140 can move to its intercepting position without striking or interfering with the light-intercepting element 40.

When the terminals 52 and 54 of FIG. 7 are connected to the source of power and the intensity of the light directed toward the vidicon or other light-sensitive tube of the television camera is within the capabilities of the automatic light compensation circuit of that camera, current will flow from terminal 52 via junction 64 and light-sensitive cell 30 to the junction 145; and then part of that current will flow through relay coil 56 and junction 66 and junction 149 to the terminal 54, while the rest of that current will flow through relay coil 156 and junction 147 and junction 149 to the terminal 54. The resistance of the light-sensitive cell 30 will be high enough to keep the current flowing through the relay coil 156 below the "pull in" level of that relay coil; and, because the level of "pull in" current for the relay coil 56 is higher than the level of "pull in" current for the relay coil 156, neither of the relays 155 and 55 will be actuated.

As a result, the movable contact 162 of the relay 155 will be in egagement with the stationary contact 158 of that relay, and the movable contact 62 of the relay 55 will be in engagement with the stationary contact 58 of that relay. Consequently, current will flow from terminal 52 via junction 64 to the junction 151; and then either through contacts 62 and 58 and rotary solenoid 38 and junctions 66 and 149 to the terminal 54, or through contacts 162 and 158 and rotary solenoid 138 and junctions 147 and 149 to that terminal. The current flowing through the rotary solenoids 38 and 138 will cause the rotors of those rotary solenoids to move the light-intercepting elements 40 and 140 out of their intercepting positions, and to hold those light-intercepting elements out of those intercepting positions. When the light-intercepting element 40 of FIG. 6 is out of its intercepting position it will be in the position indicated by FIG. 2; and when the light-intercepting element 140 is out of its intercepting position it will be in the position shown by FIG. 6. Whenever the light-intercepting elements 40 and 140 are out of their intercepting positions, they hold the light interceptors 42 and 142 out of the "field" of the vidicon or other light-sensitive tube of the camera.

If the intensity of the light directed toward the lens barrel of the camera exceeds a predetermined value—which will preferably be a value below the upper limit of the capability of the automatic light compensation circuit for that camera—the light passing through the opening 36 in the light-restricting element 34 of FIG. 6 will reduce the resistance of the light-sensitive cell 30 to the point where the relay coil 156 will move the movable contact 162 away from the stationary contact 158 and into engagement with the stationary contact 160. Thereupon, the rotary solenoid 138 will become de-energized; and the returning spring of that rotary solenoid will shift the light-intercepting element 140 to its intercepting position and dispose the light interceptor 142 in the "field" of the vidicon or other light-sensitive tube of the camera. That light-interceptor will absorb enough of the light directed toward that vidicon or other light-sensitive tube to keep the intensity of the light actually reaching that tube within the capability of the automatic light compensation circuit of the camera. As a result, there will be no "loss of picture," and the phosphors of that tube will be protected against injury. The relay coil 156 will hold the movable contact 162 away from the stationary contact 158 as long as the intensity of the light directed toward the lens barrel of the camera exceeds the said pedetermined level. However, if that intensity falls below a level at which the light passing through the opening 36 in the light-restricting element 34 of FIG. 6 permits the resistance of the light-sensitive cell 30 to increase materially, the relay coil 156 will be unable to hold the movable contact 162 out of engagement with the stationary contact 158; and that movable contact will then move back into engagement with that stationary contact. Thereupon, the rotary solenoid 138 will again be energized and the rotor thereof will move the light-intercepting element 140 to the position shown by FIG. 6.

If, while the relay coil 156 is holding the movable contact 162 out of engagement with the stationary contact 158, and is thus causing the rotary solenoid 138 to be de-energized, the intensity of the light directed toward the lens barrel of the camera increases to a level which could tend to injure the phosphors of the vidicon or other light-sensitive tube of that camera—even though part of that light was being absorbed by the light interceptor 142—the amount of light passing through the opening 36 in the light-restricting element 34 of FIG. 6 would reduce the resistance of the light-sensitive cell 30 of FIG. 7 to the point where the relay coil 56 would shift the movable contact 62 away from the stationary contact 58. Thereupon, the rotary solenoid 38 would become de-energized; and the returning spring of that rotary solenoid would shift the light-intercepting element 40 into the intercepting position shown by FIG. 6. At such time, both of the light-intercepting elements 40 and 140 would be in their intercepting positions; and both of the light-interceptors 42 and 142 would be in the "field" of the vidicon or other light-sensitive tube of the camera. The absorptive effects of those light interceptors would be additive; and the adding of the light absorption or color absorption effect of the light interceptor 42 to the light absorption or color absorption effect of the light interceptor 142 would effectively keep the intensity of the light reaching the vidicon or other light-sensitive tube of the camera from attaining a value which could injure the phosphors of that tube.

If the light which reduced the resistance of the light-sensitive cell 30 to the point where the relay 55 became actuated is transient in nature, the resistance of that light-sensitive cell will quickly rise to the point where the relay coil 56 will be unable to hold the movable contact 62 out of engagement with the stationary contact 58. Thereafter, the rotary solenoid 38 will again be actuated and the light-intercepting element 40 will move back out of its intercepting position. At such time, the light interceptor 142 carried by the light-intercepting element 140 will continue to remain in the "field" of the vidicon or other light-sensitive tube, and will continue to keep the intensity of light reaching that tube within the capability of the automatic light compensation circuit of the camera.

The control system of FIGS. 6 and 7 makes it possible to provide a closer control over the intensity of the light "seen" by the vidicon or other light-sensitive tube of the camera. Moreover, it enables that tube to be fully protected against injury at all times—even when the power is off.

The rotary solenoids 38 and 138 of FIGS. 1–7 can move the light-intercepting elements 40 and 142, respectively, from their moved positions to their intercepting positions with extreme rapidity—on the order of a few milliseconds. As a result, the instant the amounts of light reaching the light-sensitive cells 30 of FIGS. 1–7 approach levels which require the light interceptors 42 and 142 to be disposed in the "fields" of the vidicon or other light-sensitive tubes of the cameras, the rotary solenoids 38 and 138 will immediately dispose those light interceptors in those "fields." In this way, the control system provided by the present invention avoids the delays which are inherent in manual or automatic adjustment of the settings of the irises of remotely located television cameras.

Because the mounting brackets 20 and 120 are secured to the lens barrels of the cameras, the housings 28 on those mounting brackets always enable the light-sensitive cells 30 to receive light from the subjects or objects "seen" by the vidicon or other light-sensitive tubes of the cameras. Also, because those mounting brackets are secured to the lens barrels of the cameras, those brackets do not interfere with the manipulation of the various controls on those cameras.

In some instances, it is desirable to mount the housing for the light-sensitive cell 30 on a mounting bracket which is separate and distinct from the mounting bracket 20 or the mounting bracket 120. For example, where the camera is mounted in an airplane and has the lens barrel thereof directed downwardly toward the ground, and a rotatable mirror is mounted adjacent that camera to enable the vidicon or other light-sensitive tube of the camera to "see" ahead of or below that airplane, the housing for the light-sensitive cell 30 will be mounted so it will cause that light-sensitive cell 30 to "see" the sun if the direction of the airplane and the position of the sun could permit direct rays from the sun to strike the rotatable mirror and be reflected onto the vidicon or other light-sensitive tube of the camera. The control system would, where two light-intercepting elements 40 and 140 were used, dispose both of those light-intercepting elements out of their intercepting positions at night, could dispose the light-intercepting element 140 in its intercepting position during normal daylight flight, and would dispose both of the light-intercepting elements 40 and 140 in their intercepting positions whenever the light-sensitive element 30 received direct rays of the sun. In that way, the control system provided by the present invention would keep the intensity of the light reaching the vidicon or other light-sensitive tube of the camera within the capability of the automatic light compensation circuit for that camera at all times and would also keep the direct rays of the sun from reaching the vidicon or other light-sensitive tube of the camera.

Because cameras have lens barrels of different diameters, adapters are provided for the mounting brackets 20 and 120 of the present invention. Those adapters are split rings which have shallow annular grooves at the outer peripheries thereof to accommodate the split rings 24 of the mounting brackets 20 and 120. The clamping screws 26 of the mounting brackets 20 and 120 will force the split rings 24 into intimate engagement with the split-ring adapters and will thus force the inner peripheries of those split-ring adapters into clamping engagement with the lens barrels of the cameras. In this way, the mounting brackets 20 and 120 of the present invention can be solidly mounted on lens barrels having different diameters.

FIG. 8 shows a circuit which can be substituted for, and which has fewer electrical components than, the circuit of FIG. 5. That circuit has terminals 152 and 154 which will be suitably connected to a source of power; and the terminal 152 is connected to the movable contact 200 of a single pole, double throw switch. Stationary contact 204 of that switch is directly connected to one terminal of a light-sensitive cell 30—disposed within the housing 28 of FIG. 1—and the other terminal of that light-sensitive cell is connected to the terminal 154 by a junction 206 and a rotary solenoid 238. Stationary contact 202 of that switch is connected to the terminal 154 by junction 206 and the rotary solenoid 238.

The rotary solenoid 238 differs from the rotary solenoid 38 of FIGS. 1–5 in that the returning spring thereof will bias the light-intercepting element 40 out of intercepting position. This means that the rotary solenoid 238 must be energized to dispose the light-intercepting element 40 in the "field" of the vidicon or other light-sensitive tube which it is to protect.

When the camera, with which the circuit of FIG. 8 is associated, is not in use the movable contact 200 will be set in engagement with the stationary contact 202; and current will flow from terminal 152 via contacts 200 and 202, junction 206, and rotary solenoid 238 to the terminal 154. That flow of current will energize that rotary solenoid, and that rotary solenoid will hold the light-intercepting element 40 in the "field" of the vidicon or other light-sensitive tube of the camera. As a result, whenever the camera is not in use, that light-intercepting element will effectively protect the phosphors of that vidicon or other light-sensitive tube from injury.

When the camera, with which the circuit of FIG. 8 is associated, is to be used the movable contact 200 will be set in engagement with the stationary contact 204; and current will then flow from terminal 152 via contacts 200 and 204, light-sensitive cell 30, junction 206, and rotary solenoid 238 to the terminal 154. As long as the light directed toward the lens barrel of the camera has an intensity that is low enough to be within the capability of the automatic light compensation circuit for that camera and is low enough to avoid injury to the phosphors of the vidicon or other light-sensitive tube of that camera, the resistance of the light-sensitive cell 30 will be great enough to keep the current flowing through the rotary solenoid 238 below the "pull in" level. At such time the light-intercepting element 40 will be spaced from its intercepting position. Whenver the intensity of the light directed toward the lens barrel of the camera reaches a value which is beyond the capability of the automatic light compensation circuit of the camera or which could injure the phosphors of the vidicon or other light-sensitive tube of that camera, the resistance of the light-sensitive cell 30 will decrease to the point where "pull in" current will flow through the rotary solenoid 238. Thereupon, that rotary solenoid will dispose the light-intercepting element 40 in the "field" of that vidicon or oher light-sensitive tube.

In this way, the circuit of FIG. 8 and the mounting bracket 20, the housing 28, the light-restricting element 34, the light-intercepting element 40, and the light interceptor 42 of FIG. 1 permit the vidicon or other light-sensitive tube of the camera to receive all of the light directed toward it as long as the intensity of that light is below a predetermined level but keeps that vidicon or other light-sensitive tube from receiving light of an intensity which would be beyond the capability of the automatic light compensation circuit of the camera or which could injure the phosphors of that tube.

The circuit of FIG. 8 has fewer components than the circuit of FIG. 5—the single pole double throw switch being substituted for the relay coil 56 and the contacts 58, 60 and 62. That switch is less expensive than the relay 55, it is not a power-consuming device, and it generates substantially no heat.

The light-sensitive cells 30 of FIGS. 5, 7 and 8 are photoresistive cells. Such cells are desirable because they are relatively inexpensive and because they are usable in the inexpensive and reliable circuits shown by FIGS. 5, 7 and 8. However, light-sensitive cells of other types could be used, and appropriate circuits therefor could easily be provided.

Whereas the drawing and accompanying description have shown and described three preferred embodiments of the present invention it should be apparent to those skilled in the art that various changes may be made in the form of the invention without affecting the scope thereof.

What I claim is:

1. In a control system for a camera which has a light-sensitive tube:

(a) a light-sensitive cell, (b) a housing for said light-sensitive cell that substantially keeps light, from subjects and pbjects not "seen" by said light-sensitive camera tube, from reaching said light-sensitive cell, (c) a light-restricting element for said housing that permits a limited amount of light from subjects and objects "seen" by said light-sensitive camera tube to reach said light-sensitive cell, (d) a light-intercepting element that is movable into and out of the "field" of said light-sensitive camera tube to intercept light from said subjects and objects that is directed toward said light-sensitive camera tube, (e) an actuator for said light-intercepting element that can moved said light-intercepting element into and out of said "field" to intercept and not intercept light from said subjects and objects that is directed toward said light-sensitive camera tube, (f) a circuit that includes said light-sensitive cell and said actuator and that responds to a predetermined intensity of light reaching said light-sensitive cell to cause said actuator to dispose said light-intercepting element in said "field" and thereby intercept light from said subjects and objects that is directed toward said light-sensitive camera tube, (g) said circuit enabling said actuator to disposed said light-intercepting element out of said "field," and thereby not intercept light from said subjects and objects that is directed toward said light-sensitive camera tube, whenever the intensity of light reaching said light sensitive cell is below said predetermined intensity, (h) a second light-intercepting element that is movable into and out of the "field" of said light-sensitive camera tube to intercept light from said subjects and objects that is directed toward said light-sensitive camera tube, (i) a second actuator for said second light-intercepting element that can move said second light-intercepting element into and out of said "field" to intercept and not intercept light from said subjects and objects that is directed toward said light-sensitive camera tube, (j) said circuit having a sub-circuit that responds to a second and lesser predetermined intensity of light reaching said light-sensitive cell to cause said second actuator to dispose said second light-intercepting element in said "field" and thereby intercept light from said subjects and objects that is directed toward said light-sensitive camera tube, (k) said sub-circuit enabling said second actuator to dispose said second light-intercepting element out of said "field," and thereby not intercept light from said subjects and objects that is directed toward said light-sensitive camera tube, whenever the intensity of light reaching said light-sensitive cell is below said second predetermined intensity, (l) a mounting bracket that is releasably securable to the lens barrel of said camera and that supports said light-sensitive cell and said housing and said actuators, (m) said mounting bracket causing said housing to move with said camera so light from subjects and objects "seen" by said light-sensitive camera tube will reach said light-sensitive cell, regardless of the positioning of said camera, (n) said mounting bracket having a split ring that can be tightened to secure said mounting bracket to said lens barrel of said camera, (o) said light-restricting element having an opening of predetermined size therein to permit light from subjects and objects "seen" by said light-sensitive camera tube to reach said light sensitive cell, (p) the first said light-intercepting element carrying a light interceptor that transmits some light, (q) said second light-intercepting element carrying a second light interceptor that transmits more light, (r) said actuators being rotary solenoids, (s) said light-restricting element being one of a plurality of light-restricting elements having openings of different sizes therein, (t) said light interceptors being two of a plurality of light interceptors that transmit different amounts of light, (u) said second actuator disposing said second light-intercepting element forwardly of the first said light-intercepting element so both of said light-intercepting elements can be simultaneously disposed in said "field,"

(v) said circuit causing said actuators to disposed both of said light-transmitting elements in said "field" whenever no power is supplied to said circuit and whenever the intensity of the light reaching said light-sensitive cell exceeds the first said predetermined intensity, (w) said circuit causing said second actuator to dispose said second light-intercepting element in said "field" whenever the intensity of the light reaching said light-sensitive cell exceeds said second predetermined intensity but does not exceed the first said predetermined intensity, (x) said circuit causing said actuators to dispose both of said light-intercepting elements out of said "field" whenever power is supplied to said circuit but the intensity of the light reaching said light-sensitive cell but does not exceed said second predetermined intensity, (y) said circuit including a relay with a normally-closed contact in series with the first said actuator and including a second relay with a normally-closed contact in series with said second actuator, (z) said second relay having a "pull in" current level smaller than the "pull in" current level of the first said relay.

2. In a control system for a camera which has a light-sensitive tube:

(a) a light-sensitive cell, (b) a housing for said light-sensitive cell that substantially keeps light, from subjects and objects not "seen" by said light-sensitive camera tube, from reaching said light-sensitive cell, (c) said housing permitting a limited amount of light from subjects and objects "seen" by said light-sensitive camera tube to reach said light-sensitive cell, (d) a light-intercepting element that is movable into and out of the "field" of said light-sensitive camera tube to intercept light from said subjects and objects that is directed toward said light-sensitive camera tube, (e) an actuator for said light-intercepting element that can move said light-intercepting element into and out of said "field" to intercept and not intercept light from said subjects and objects that is directed toward said light-sensitive camera tube, (f) a circuit that includes said light-sensitive cell and said actuator and that responds to a predetermined intensity of light reaching said light-sensitive cell to cause said actuator to dispose said light-intercepting element in said "field" and thereby intercept light from said subjects and objects that is directed toward said light-sensitive camera tube, (g) said circuit enabling said actuator to dispose said light-intercepting element out of said "field," and thereby not intercept light from said subjects and objects that is directed toward said light-sensitive camera tube, whenever the intensity of light reaching said light-sensitive cell is below said predetermined intensity, (h) a second light-intercepting element that is movable into and out of the "field" of said light-sensitive camera tube to intercept and not intercept light from said subjects and objects that is directed toward said light-sensitive camera tube, (i) a second actuator for said second light-intercepting element that can move said second light-intercepting element into and out of said "field" to intercept and not intercept light from said subjects and objects that is directed toward said light-sensitive camera tube, (j) said circuit having a sub-circuit that responds to a second and lesser predetermined intensity of light reaching said light-sensitive cell to cause said second actuator to dispose said second light-intercepting element in said "field" and thereby intercept light from said subjects and objects that is directed toward said light-sensitive camera tube, (k) said sub-circuit enabling said second actuator to dispose said second light-intercepting element out of said "field," and thereby not intercept light from said subjects and objects that is directed toward said light-sensitive camera tube, whenever the intensity of light reaching said light-sensitive cell is below said second predetermined intensity, (l) a mounting bracket that is releasably securable to said camera and that supports said light-sensitive cell and said housing and said actuators, (m) said mounting bracket causing said housing to move with said camera so light from subjects and objects "seen" by said light-sensitive camera tube will reach said light-sensitive cell, regardless of the positioning of said camera, (n) the first said light-intercepting element carrying a light interceptor that transmits some light, (o) said second light-intercepting element carrying a second light interceptor that transmits more light, (p) said actuators being rotary solenoids, (q) said light interceptors being two of a plurality of light interceptors that transmit different amounts of light, (r) said second actuator disposing said second light-intercepting element out of register with the first said light-intercepting element so both of said light-tercepting elements can be simultaneously disposed in said "field,"

(s) said circuit causing said actuators to dispose both of said light-transmitting elements in said "field" whenever no power is supplied to said circuit and whenever the intensity of the light reaching said light-sensitive cell exceeds the first said predetermined intensity, (t) said circuit causing said second actuator to dispose said second light-intercepting element in said "field" whenever the intensity of the light reaching said light-sensitive cell exceeds said second predetermined intensity but does not exceed the first said predetermined intensity, (u) said circuit causing said actuators to dispose both of said light-intercepting elements out said "field" whenever power is supplied to said circuit but the intensity of the light reaching said light-sensitive cell but does not exceed said second predetermined intensity, (v) said circuit including a relay which controls the first said actuator and including a second relay which controls said second actuator, (w) said second relay having a "pull in" current level smaller than the "pull in" current level of the first said relay.

3. In a control system for a camera which has a light-sensitive tube:

(a) a light-sensitive cell, (b) a housing for said light-sensitive cell that substantially keeps light, from subjects and objects not "seen" by said light-sensitive camera tube, from reaching said light-sensitive cell, (c) said housing permitting a limited amount of light from subjects and objects "seen" by said light-sensitive camera tube to reach said light-sensitive cell, (d) a light-intercepting element that is movable into and out of the "field" of said light-sensitive camera tube to intercept light from said subjects and objects that is directed toward said light-sensitive camera tube, (e) an actuator for said light-intercepting element that can move said light-intercepting element into and out of said "field" to intercept and not intercept light from said subjects and objects that is directed toward said light-sensitive camera tube, (f) a circuit that includes said light-sensitive cell and said actuator and that responds to a predetermined intensity of light reaching said light-sensitive cell to cause said actuator to dispose said light-intercepting element in said "field" and thereby intercept light from said subjects and objects that is directed toward said light-sensitive camera tube, (g) said circuit enabling said actuator to dispose said light-intercepting element out of said "field," and thereby not intercept light from said subjects and objects that is directed toward said light-sensitive camera tube, whenever the intensity of light reaching said light-sensitive cell is below said predetermined intensity, (h) a second light-intercepting element that is movable into and out of the "field" of said light-sensitive camera tube to intercept and not intercept light from said subjects and objects that is directed toward said light-sensitive camera tube, (i) a second actuator for said second light-intercepting element that can move said second light-intercepting element into and out of said "field" to intercept and not intercept light from said subjects and objects that its directed toward said light-sensitive camera tube, (j) said circuit having a sub-circuit that responds to a second and lesser predetermined intensity of light reaching said light-sensitive cell to cause said second actuator to dispose said second light-intercepting element in said "field" and thereby intercept light from said subjects and objects that is directed toward said light-sensitive camera tube, (k) said sub-circuit enabling said second actuator to dispose said second light-intercepting element out of said "field," and thereby not intercept light from said subjects and objects that is directed toward said light-sensitive camera tube, whenever the intensity of light reaching said light-sensitive cell is below said second predetermined intensity, (l) said second light-intercepting element carying a light interceptor that can transmit light, (m) said second actuator disposing said second light-intercepting element out of register with the first said light-intercepting element so both of said light-intercepting elements can be simultaneously disposed in said "field,"

(n) said circuit causing said actuators to dispose both of said light-transmitting elements in said "field" whenever no power is supplied to said circuit and whenever the intensity of the light reaching said light-sensitive cell exceeds the first said predetermined intensity, (o) said circuit causing said second actuator to dispose said second light-intercepting element in said "field" whenever the intensity of the light reaching said light-sensitive cell exceeds said second predetermined intensity but does not exceed the first said predetermined intensity, (p) said circuit causing said actuators to dispose both of said light-intercepting elements out of said "field" whenever power is supplied to said circuit but the intensity of the light reaching said light-sensitive cell but does not exceed said second predetermined intensity.

4. In a control system for a camera which has a light-sensitive tube:

(a) a light-sensitive cell, (b) a housing for said light-sensitive cell that substantially keeps light, from subjects and objects not "seen" by said light-sensitive camera tube, from reaching said light-sensitive cell, (c) a light-intercepting element that is movable into and out of position to intercept light from said subjects and objects that is directed toward said light-sensitive camera tube, (d) an actuator for said light-intercepting element that can move said light-intercepting element into and out of position to intercept light from said subjects and objects that is directed toward said light-sensitive camera tube, (e) a circuit that includes said light-sensitive cell and said actuator and that responds to a predetermined intensity of light reaching said light-sensitive cell to cause said actuator to dispose said light-intercepting element in position to intercept light from said subjects and objects that is directed toward said light-sensitive camera tube, (f) said circuit enabling said actuator to dispose said light-intercepting element out of intercepting position whenever the intensity of light reaching said light-sensitive cell is below said predetermined intensity, and (g) a mounting bracket that is releasably securable to the lens barrel of said camera and that supports said light-sensitive cell and said housing and said actuator, (h) said mounting bracket causing said housing to move with said camera so light from subjects and objects "seen" by said light-sensitive camera tube will reach said light-sensitive cell, regardless of the positioning of said camera, (i) said light-intercepting element including a light interceptor that transmits some light, (j) said light-sensitive cell being separate from and in addition to said light-sensitive tube of said camera, (k) said housing for said light-sensitive cell being separate from and in addition to the housing for said light-sensitive tube of said camera, (l) said light-intercepting element being out of register with said light-sensitive cell, whenever it is in light-intercepting position, so light directed toward said light-sensitive camera tube can continue to pass to said light-sensitive cell, (m) said circuit being separate from and in addition to the circuit for said light-sensitive camera tube, (n) said light-intercepting element and said actuator for said light-intercepting element and said housing for said light-sensitive cell being mounted exteriorly of said camera, (o) said actuator being a solenoid, (p) said actuator, whenever it is de-energized, permitting said light-intercepting element to move into intercepting position, whereby said control system will "fail safe,"

(g) said control system being separate from and in addition to any automatic light compensation system of said camera.

5. In a control system for a camera which has a light-sensitive tube:

(a) a light-sensitive cell, (b) a housing for said light-sensitive cell that substantially keeps light, from subjects and objects not "seen" by said light-sensitive camera tube, from reaching said light-sensitive cell, (c) a light-intercepting element that is movable into and out of position to intercept light from said subjects and objects that is directed toward said light-sensitive camera tube, (d) an actuator for said light-intercepting element that can move said light-intercepting element into and out of position to intercept light from said subjects and objects that is directed toward said light-sensitive camera tube, (e) a circuit that includes said light-sensitive cell and said actuator and that responds to a predetermined intensity of light reaching said light-sensitive cell to cause said actuator to dispose said light-intercepting element in position to intercept light from said subjects and objects that is directed toward said light-sensitive camera tube, (f) said circuit enabling said actuator to dispose said light-intercepting element out of intercepting position whenever the intensity of light reaching said light-sensitive cell is below said predetermined intensity, (g) said light-intercepting element including a light-interceptor that transmits some light, (h) said light-sensitive cell being separate from and in addition to said light-sensitive tube of said camera, (i) said housing for said light-sensitive cell being separate from and in addition to the housing for said light-sensitive tube of said camera, (j) said light-intercepting element being out of register with said light-sensitive cell, whenever it is in light-intercepting position, so light directed toward said light-senstitive camera tube can continue to pass to said light-sensitive cell, (k) said circuit being separate from and in addition to the circuit for said light-sensitive camera tube, (l) said light-intercepting element and said actuator for said light-intercepting element and said housing for said light-sensitive cell being mounted exteriorly of said camera, (m) said actuator, whenever it is de-energized, permitting said light-intercepting element to move into intercepting position, whereby said control system will "fail safe,"

(n) said control system being separate from and in addition to any automatic light compensation system of said camera.

6. In a control system for a camera which has a light-sensitive tube:

(a) a light-sensitive cell, (b) a housing for said light-sensitive cell that substantially keeps light, from subjects and objects not "seen" by said light-sensitive camera tube. from reaching said light-sensitive cell,
(c) a light-intercepting element that is movable into and out of position to intercept light from said subjects and objects that is directed toward said light-sensitive camera tube,
(d) an actuator for said light-intercepting element that can move said light-intercepting element into and out of position to intercept light from said subjects and objects that is directed toward said light-sensitive camera tube,
(e) a circuit that includes said light-sensitive cell and said actuator and that responds to a predetermined intensity of light reaching said light-sensitive cell to cause said actuator to dispose said light-intercepting element in position to intercept light from said subjects and objects that is directed toward said light-sensitive camera tube,
(f) said circuit enabling said actuator to dispose said light-intercepting element out of intercepting position whenever the intensity of light reaching said light-sensitive cell is below said predetermined intensity, and
(g) a mounting bracket that is releasably securable to the lens barrel of said camera and that supports said light-sensitive cell and said housing and said actuator,
(h) said light-sensitive cell being separate from and in addition to said light-sensitive tube of said camera,
(i) said housing for said light-sensitive cell being separate from and in addition to the housing for said light-sensitive tube of said camera,
(j) said light-intercepting element being out of register with said light-sensitive cell, whenever it is in light-intercepting position, so light directed toward said light-sensitive camera tube can continue to pass to said light-sensitive cell,
(k) said circuit being separate from and in addition to the circuit for said light-sensitive camera tube,
(l) said light-intercepting element and said actuator for said light-intercepting element and said housing for said light-sensitive cell being mounted exteriorly of said camera,
(m) said control system being separate from and in addition to any automatic light compensation system of said camera.

7. In a control system for a camera which has a light-sensitive tube:
(a) a light-sensitive cell,
(b) a housing for said light-sensitive cell that substantially keeps light, from subjects and objects not "seen" by said light-sensitive camera tube, from reaching said light-sensitive cell,
(c) a light-restricting element for said housing that permits a limited amount of light from subjects and objects "seen" by said light-sensitive camera tube to reach said light-sensitive cell,
(d) a light-intercepting element that is movable into and out of position to intercept light from said subjects and objects that is directed toward said light-sensitive camera tube,
(e) an actuator for said light-intercepting element that can move said light-intercepting element into and out of position to intercept light from said subjects and objects that is directed toward said light-sensitive camera tube,
(f) a circuit that includes said light-sensitive cell and said actuator and that responds to a predetermined intensity of light reaching said light-sensitive cell to cause said actuator to dispose said light-intercepting element in position to intercept light from said subjects and objects that is directed toward said light-sensitive camera tube,
(g) said circuit enabling said actuator to dispose said light-intercepting element out of intercepting position whenever the intensity of light reaching said light-sensitive cell is below said predetermined intensity, and
(h) a mounting bracket that is releasably securable to the lens barrel of said camera and that supports said light-sensitive cell and said housing and said actuator,
(i) said mounting bracket causing said housing to move with said camera so light from subjects and objects "seen" by said light-sensitive camera tube will reach said light-sensitive cell, regardless of the positioning of said camera,
(j) said light-intercepting element including a light interceptor that transmits some light,
(k) said actuator being a rotary solenoid,
(l) said light-restricting element being one of a plurality of light-restricting elements having different light-restricting capabilities,
(m) said light-intercepting element being one of a plurality of light-intercepting elements that transmit different amounts of light,
(n) said light-sensitive cell being separate from and in addition to said light-sensitive tube of said camera,
(o) said housing for said light-sensitive cell being separate from and in addition to the housing for said light-sensitive tube of said camera,
(p) said light-intercepting element being out of register with said light-sensitive cell, whenever it is in light-intercepting position, so light directed toward said light-sensitive camera tube can continue to pass to said light-sensitive cell,
(q) said circuit being separate from and in addition to the circuit for said light-sensitive camera tube,
(r) said light-intercepting element and said actuator for said light-intercepting element and said housing for said light-sensitive cell being mounted exteriorly of said camera,
(s) said actuator, whenever it is de-energized, permitting said light-intercepting element to move into intercepting position, whereby said control system will "fail safe."

8. In a control system for a camera which has a light-sensitive tube:
(a) a light-sensitive cell,
(b) a housing for said light-sensitive cell that substantially keeps light, from subjects and objects not "seen" by said light-sensitive camera tube, from reaching said light-sensitive cell,
(c) a light-restricting element for said housing that permits a limited amount of light from subjects and objects "seen" by said light-sensitive camera tube to reach said light-sensitive cell,
(d) a light-intercepting element that is movable into and out of position to intercept light from said subjects and objects that is directed toward said light-sensitive camera tube,
(e) an actuator for said light-intercepting element that can move said light-intercepting element into and out of position to intercept light from said subjects and objects that is directed toward said light-sensitive camera tube,
(f) a circuit that includes said light-sensitive cell and said actuator and that responds to a predetermined intensity of light reaching said light-sensitive cell to cause said actuator to dispose said light-intercepting element in position to intercept light from said subjects and objects that is directed toward said light-sensitive camera tube,
(g) said circuit enabling said actuator to dispose said light-intercepting element out of intercepting position whenever the intensity of light reaching said light-sensitive cell is below said predetermined intensity, and
(h) a mounting bracket that is releasably securable to the lens barrel of said camera and that supports said light-sensitive cell and said housing and said actuator, (i) said mounting bracket causing said housing to move with said camera so light from subjects and objects "seen" by said light-sensitive camera tube will reach said light-sensitive cell, regardless of the positioning of said camera, (j) said light-intercepting element including a light interceptor that transmits some light, (k) said actuator being a rotary solenoid, (l) said light-sensitive cell being separate from and in addition to said light-sensitive tube of said camera, (m) said housing for said light-sensitive cell being separate from and in addition to the housing for said light-sensitive tube of said camera, (n) said light-intercepting element being out of register with said light-sensitive cell, whenever it is in light-intercepting position, so light directed toward said light-sensitive camera tube can continue to pass to said light-sensitive cell, (o) said circuit being separate from and in addition to the circuit for said light-sensitive camera tube, (p) said light-intercepting element and said actuator for said light-intercepting element and said housing for said light-sensitive cell being mounted exteriorly of said camera, (q) said actuator, whenever it is de-energized, permitting said light-intercepting element to move into intercepting position, whereby said control system will "fail safe."

9. In a control system for a camera which has a light-sensitive tube:

(a) a light-sensitive cell, (b) a housing for said light-sensitive cell that substantially keeps light, from subjects and objects not "seen" by said light-sensitive camera tube, from reaching said light-sensitive cell, (c) a light-restricting element for said housing that permits a limit amount of light from subjects and objects "seen" by said light sensitive camera tube to reach said light-sensitive cell, (b) a light-intercepting element that is movable into and out of position to intercept light from said subjects and objects that is directed toward said light-sensitive camera tube, (e) an actuator for said light-intercepting element that can move said light-intercepting element into and out of position to intercept light from said subjets and objects that is directed toward said light sensitive camera tube, (f) a circuit that includes said light-sensitive cell and said actuator and that responds to a predetermined intensity of light reaching said light-sensitive cell to cause said actuator to dispose said light-intercepting element in position to intercept light from said subjects and objects that is directed toward said light-sensitive camera tube, (g) said circuit enabling said actuator to dispose said light-intercepting element out of intercepting position whenever the intensity of light reaching said light-sensitive cell is below said predetermined intensity, and (h) a mounting bracket that is releasably securable to the lens barrel of said camera and that supports said light-sensitive cell and said housing and said actuator, (i) said mounting bracket causing said housing to move with said camera so light from subjects and objects "seen" by said light-sensitive camera tube will reach said light-sensitive cell, regardless of the positioning of said camera, (j) said light-sensitive cell being separate from and in addition to said light-sensitive tube of said camera, (k) said housing for said light-sensitive cell being separate from and in addition to the housing for said light-sensitive tube of said camera, (l) said light-intercepting element being out of register with said light-sensitive cell, whenever it is in light-intercepting position, so light directed toward said light-sensitive camera tube can continue to pass to said light-sensitive cell, (m) said circuit being separate from and in addition to the circuit for said light-sensitive camera tube, (n) said light-intercepting element and said actuator for said light-intercepting element and said housing for said light-sensitive cell being mounted exteriorly of said camera.

10. A control system, for a camera which has a vidicon or other light-sensitive tube, that comprises:

(a) a light-sensitive cell, (b) said light-sensitive cell being disposed so it receives light from the subjects or objects "seen" by said vidicon or other light-sensitive tube, (c) a light-intercepting element that is movable into and out of the "field" of said vidicon or other light-sensitive tube, and (d) an actuator connected to said light-intercepting element that can selectively move said light-intercepting element into and out of said "field" of said vidicon or other light-sensitive tube, (e) said light-sensitive cell and said actuator automatically disposing said light-intercepting element in the "field" of said vidicon or other light-sensitive tube whenever the value of light reaching said light-sensitive cells attains a predetermined level, and (f) a mounting bracket that is securable to said camera, (g) said mounting bracket holding said light-sensitive cell so it receives light from the subjects and objects "seen" by said vidicon or other light sensitive tube irrespective of the position of said camera, (h) said light-sensitive cell being separate from and in addition to said light-sensitive tube of said camera, (i) said light-intercepting element being out of register with said light-sensitive cell, whenever it is in light-intercepting position, so light directed toward said light-sensitive camera tube can continue to pass to said light-sensitive cell, (j) said light-intercepting element and said actuator for said light-intercepting element being mounted exteriorly of said camera and on said mounting bracket.

11. A control system, for a camera which has a vidicon or other light-sensitive tube, that comprises:

(a) a light-sensitive cell, (b) said light-sensitive cell being disposed so it receives light from the subjects or objects "seen" by said vidicon or other light-sensitive tube, (c) a light-intercepting element that is movable into and out of the "field" of said vidicon or other light-sensitive tube, and (d) an actuator connected to said light-intercepting element that can selectively move said light-intercepting element into and out of said "field" of said vidicon or other light-sensitive tube, (e) said light-sensitive cell and said actuator automatically disposing said light-intercepting element in the "field" of said vidicon or other light-sensitive tube whenever the value of light reaching said light-sensitive cells attains a predetermined level, (f) said actuator being a rotary solenoid, (g) said light-sensitive cell being separate from and in addition to said light-sensitive tube of said camera, (h) said light-intercepting element being out of register with said light-sensitive cell, whenever it is in light-intercepting position, so light directed toward said light-sensitive camera tube can continue to pass to said light-sensitive cell, (i) said light-intercepting element and said actuator for said light-intercepting element being mounted exteriorly of said camera and on said mounting bracket, (j) said actuator, whenever it is de-energized, permitting said light-intercepting element to move into intercepting position, whereby said control system will "fail safe,"

(k) said control system being separate from and in addition to any automatic light compensation system of said camera.

12. A control system, for a camera which has a vidicon or other light-sensitive tube, that comprises:

(a) a light-sensitive cell, (b) said light-sensitive cell being disposed so it receives light from the subjects or objects "seen" by said vidicon or other light-sensitive tube, (c) a light-intercepting element that is movable into and out of the "field" of said vidicon or other light-sensitive tube, and (d) an actuator connected to said light-intercepting element that can selectively move said light-intercepting element into and out of said "field" of said vidicon or other light-sensitive tube, (e) said light-sensitive cell and said actuator automatically disposing said light-intercepting element in the "field" of said vidicon or other light-sensitive tube whenever the value of light reaching said light-sensitive cells attains a predetermined level, and (f) a housing for said-light sensitive cell that has a replaceable light-restricting element, (g) said light-sensitive cell being separate from and in addition to said light-sensitive tube of said camera, (h) said housing for said ilght-sensitive cell being separate from and in addition to the housing for said light-sensitive tube of said camera, (i) said light-intercepting element being out of register with said light-sensitive cell, whenever it is in light-intercepting position, so light directed toward said light-sensitive camera tube can continue to pass to said light-sensitive cell, (j) said light-intercepting element and said actuator for said light-intercepting element and said housing for said light-sensitive cell being mounted exteriorly of said camera.

13. A control system, for a camera which has a vidicon or other light-sensitive tube, that comprises:

(a) a light-sensitive cell, (b) said light-sensitive cell being disposed so it receives light from the subjects or objects "seen" by said vidicon or other light-sensitive tube, (c) a light-intercepting element that is movable into and out of the "field" of said vidicon or other light-sensitive tube, and (d) an actuator connected to said light-intercepting element that can selectively move said light-intercepting element into and out of said "field" of said vidicon or other light-sensitive tube, (e) said light-sensitive cell and said actuator automatically disposing said light-intercepting element in the "field" of said vidicon or other light-sensitive tube whenever the value of light reaching said light-sensitive cells attains a predetermined level, (f) said light-intercepting element being capable of transmitting some light, (g) said light-intercepting element being one of a plurality of light-intercepting elements having different degrees of light transmissibility, (h) said light-sensitive cell being separate from and in addition to said light-sensitive tube of said camera, (i) said light-intercepting element being out of register with said light-sensitive cell, whenever it is in light-intercepting position, so light directed toward said light-sensitive camera tube can continue to pass to said light-sensitive cell, (j) said light-intercepting element and said actuator for said light-intercepting element being mounted exteriorly of said camera and on said mounting bracket, (k) said control system being separate from and in addition to any automatic light compensation system of said camera.

14. A control system, for a camera which has a vidicon or other light-sensitive tube, that comprises:

(a) a light-sensitive cell, (b) said light-sensitive cell being disposed so it receives light from the subjects or objects "seen" by said vidicon or other light-sensitive tube, (c) a light-intercepting element that is movable into and out of the "field" of said vidicon or other light-sensitive tube, and (d) an actuator connected to said light-intercepting element that can selectively move said light-intercepting element into and out of said "field" of said vidicon or other light-sensitive tube, (e) said light-sensitive cell and said actuator automatically disposing said light-intercepting element in the "field" of said vidicon or other light-sensitive tube whenever the value of light reaching said light-sensitive cells attains a predetermined level, (f) said actuator moving said light-intercepting element from a position where it is not in the "field" of said vidicon or other light-sensitive tube to a position where it is in the "field" of said vidicon or other light-sensitive tube in a few milliseconds, (g) said light-sensitive cell being separate from and in addition to said light-sensitive tube of said camera, (h) said light-intercepting element being out of register with said light-sensitive cell, whenever it is in light-intercepting position, so light directed toward said light-sensitive camera tube can continue to pass to said light-sensitive cell, (i) said light-intercepting element and said actuator for said light-intercepting element being mounted exteriorly of said camera and on said mounting bracket, (j) said actuator, whenever it is de-energized, permitting said light-intercepting element to move into intercepting position, whereby said control system will "fail safe."

15. A control system, for a camera which has a vidicon or other light-sensitive tube, that comprises:

(a) a light-sensitive cell, (b) said light-sensitive cell being disposed so it receives light from the subjects or objects "seen" by said vidicon or other light-sensitive tube, (c) a light-intercepting element that is movable into and out of the "field" of said vidicon or other light-sensitive tube, and (d) an actuator connected to said light-intercepting element that can selectively move said light-intercepting element into and out of said "field" of said vidicon or other light-sensitive tube, (e) said light-sensitive cell and said actuator automatically disposing said light-intercepting element in the "field" of said vidicon or other light-sensitive tube whenever the value of light reaching said light-sensitive cell attains a predetermined level, (f) said light-intercepting element transmitting some light to said vidicon or other light-sensitive tube, even when it is in its intercepting position, to prevent "loss of picture,"

(g) said light-sensitive cell being separate from and in addition to said light-sensitive tube of said camera, (h) said light-intercepting element being out of register with said light-sensitive cell, whenever it is in light-intercepting position, so light directed toward said light-sensitive camera tube can continue to pass to said light-sensitive cell, (i) said light-intercepting element and said actuator for said light-intercepting element being mounted exteriorly of said camera and on said mounting bracket, (j) said control system being separate from and in addition to any automatic light compensation system of said camera.

16. In a control system for a camera which has a light-sensitive tube:
(a) a light-sensitive cell,
(b) a light-intercepting element that is movable into and out of the "field" of said light-sensitive camera tube to intercept light from subjects and objects "seen" by said light-sensitive camera tube,
(c) an actuator for said light-intercepting element that can move said light-intercepting element into and out of said "field" to intercept and not intercept light from said subjects and objects that is directed toward said light-sensitive camera tube,
(d) a circuit that includes said light-sensitive cell and said actuator and that responds to a predetermined intensity of light reaching said light-sensitive cell to cause said actuator to dispose said light-intercepting element in said "field" and thereby intercept light from said subjects and objects that is directed toward said light-sensitive camera tube,
(e) said circuit enabling said actuator to dispose said light-intercepting element out of said "field," and thereby not intercept light from said subjects and objects that is directed toward said light-sensitive camera tube, whenever the intensity of light reaching said light-sensitive cell is below said predetermined intensity,
(f) a second light-intercepting element that is movable into and out of the "field" of said light-sensitive camera tube to intercept and not intercept light from said subjects and objects that is directed toward said light-sensitive camera tube,
(g) a second actuator for said second light-intercepting element that can move said second light-intercepting element into and out of said "field" to intercept and not intercept light from said subjects and objects that is directed toward said light-sensitive camera tube,
(h) said circuit having a sub-circuit that responds to a second and lesser predetermined intensity of light reaching said light-sensitive cell to cause said second actuator to dispose said second light-intercepting element in said "field" and thereby intercept light from said subjects and objects that is directed toward said light-sensitive camera tube,
(i) said sub-circuit enabling said second actuator to dispose said second light-intercepting element out of said "field," and thereby not intercept light from said subjects and objects that is directed toward said light-sensitive camera tube, whenever the intensity of light reaching said light-sensitive cell is below said second predetermined intensity,
(j) said second light-intercepting element being capable of transmitting some light,
(k) said second actuator being disposed relative to the first said actuator so both of said light-intercepting elements can be simultaneously disposed in said "field,"
(l) said circuit causing said actuators to dispose both of said light-transmitting elements in said "field" whenever no power is supplied to said circuit and whenever the intensity of the light reaching said light-sensitive cell exceeds the first said predetermined intensity.

17. In a control system for a camera which has a light-sensitive tube:
(a) a light-sensitive cell,
(b) said light-sensitive cell being disposed to receive light from subjects and objects "seen" by said light-sensitive camera tube,
(c) a light-intercepting element that is movable into and out of position to intercept light from said subjects and objects that is directed toward said light-sensitive camera tube, (d) an actuator for light-intercepting element that can move said light-intercepting element into and out of position to intercept light from said subjects and objects that is directed toward said light-sensitive camera tube,
(e) a circuit that includes said light-sensitive cell and said actuator and that responds to a predetermined intensity of light on said light-sensitive cell to cause said actuator to dispose said light-intercepting element in position to intercept light from said subjects and objects that is directed toward said light-sensitive camera tube,
(f) said circuit enabling said actuator to dispose said light-intercepting element out of intercepting position whenever the intensity of light on said light-sensitive cell is below said predetermined intensity,
(g) said actuator and said light-sensitive cell being connected in series in said circuit,
(h) said actuator disposing said light-intercepting element out of intercepting position whenever it is de-energized,
(i) said circuit including a sub-circuit that keeps said actuator energized whenever said control system is not being used,
(j) said light-sensitive cell being separate from and in addition to said light-sensitive tube of said camera,
(k) said light-intercepting element being out of register with said light-sensitive cell, whenever it is in light-intercepting position, so light directed toward said light-sensitive camera tube can continue to pass to said light-sensitive cell,
(l) said circuit being separate from and in addition to the circuit for said light-sensitive camera tube,
(m) said light-intercepting element and said actuator for said light-intercepting element and said housing for said light-sensitive cell being mounted exteriorly of said camera.

18. In a control system for a camera which has a light-sensitive tube:
(a) a light-sensitive cell,
(b) said light-sensitive cell being disposed to receive light from subjects and objects "seen" by said light-sensitive camera tube,
(c) a light-intercepting element that is movable into and out of position to intercept light from said subjects and objects that is directed toward said light-sensitive camera tube,
(d) an actuator for said light-intercepting element that can move said light-intercepting element into and out of position to intercept light from said subjects and objects that is directed toward said light-sensitive camera tube,
(e) a circuit that includes said light-sensitive cell and said actuator and that responds to a predetermined intensity of light on said light-sensitive cell to cause said actuator to dispose said light-intercepting element in position to intercept light from said subjects and objects that is directed toward said light-sensitive camera tube,
(f) said circuit enabling said actuator to dispose said light-intercepting element out of intercepting position whenever the intensity of light on said light-sensitive cell is below said predetermined intensity,
(g) said actuator and said light-sensitive cell being connected in series in said circuit,
(h) said light-sensitive cell being separate from and in addition to said light-sensitive tube of said camera,
(i) said light-intercepting element being out of register with said light-sensitive cell, whenever it is in light-intercepting position, so light directed toward said light-sensitive camera tube can continue to pass to said light-sensitive cell,
(j) said circuit being separate from and in addition to the circuit for said light-sensitive camera tube,
(k) said light-intercepting element and said actuator for said light-intercepting element and said housing for said light-sensitive cell being mounted exteriorly of said camera, (1) said control system being separate from and in addition to any automatic light compensation system of said camera.

References Cited

UNITED STATES PATENTS

| | | | |
|---|---|---|---|
| 2,421,476 | 6/1947 | Belar et al. | 178—7.2 |
| 2,431,824 | 12/1947 | Poch | 178—7.2 |
| 2,965,712 | 12/1960 | Pike et al. | 178—7.2 |
| 3,010,362 | 11/1961 | Smith | 178—7.2 |
| 3,061,673 | 10/1962 | Fathauer et al. | 178—7.2 |
| 3,182,125 | 5/1965 | Kampmeyer et al. | 178—7.2 |
| 3,208,339 | 9/1965 | Tiffenberg et al. | 350—315 XR |

OTHER REFERENCES

Poehls: "TV Camera Protection Circuit," RCA Technical Note No. 459, September 1961.

ROBERT L. GRIFFIN, *Primary Examiner.*

JOHN W. CALDWELL, *Examiner.*

R. L. RICHARDSON, *Assistant Examiner.*